Aug. 6, 1957     J. E. M. TAYLOR     2,801,829
SUPERSONIC AIRPLANE COOLING SYSTEM
Filed Feb. 24, 1955     2 Sheets-Sheet 1
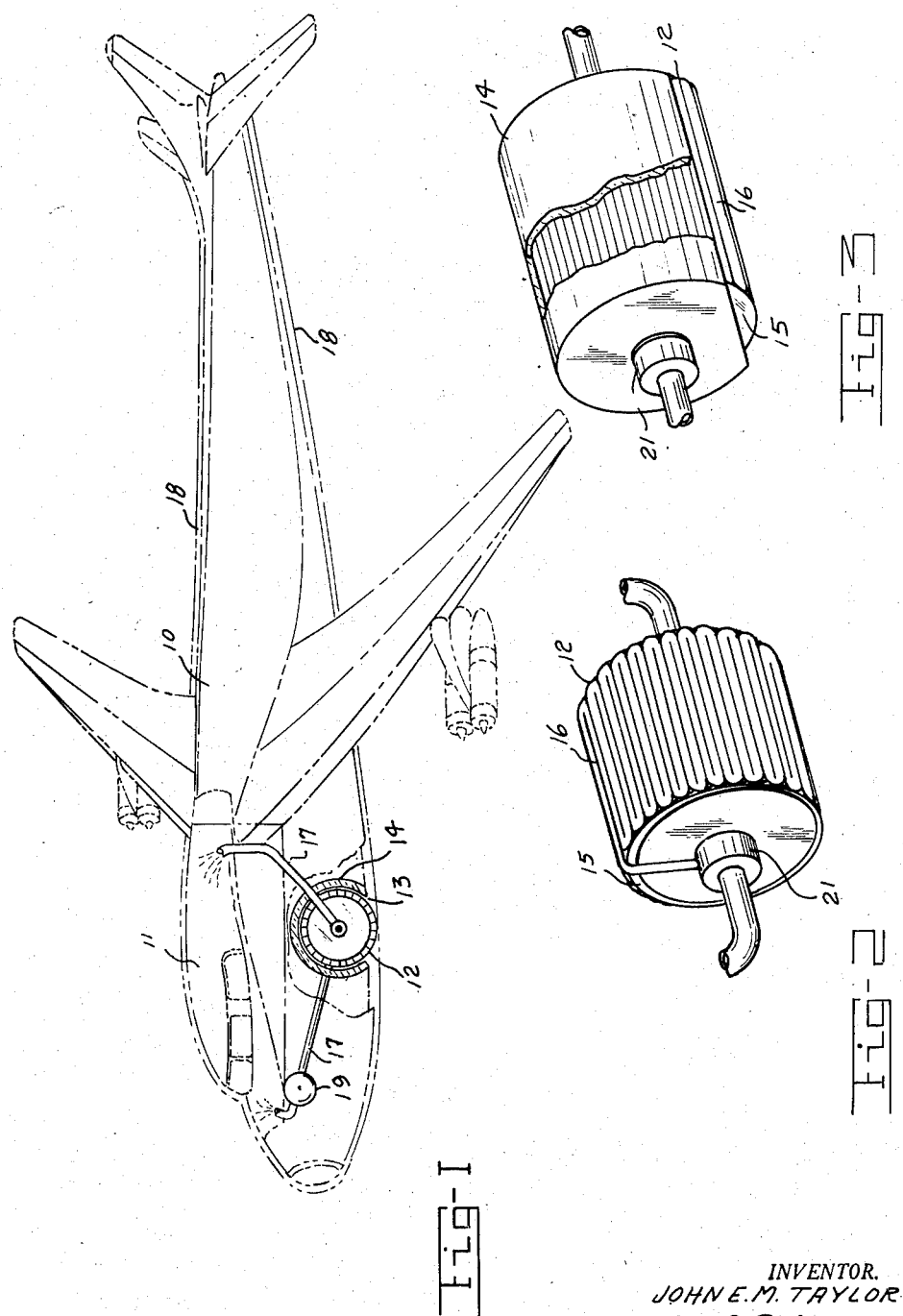
INVENTOR.
JOHN E. M. TAYLOR
BY *Julius S. Rubinstein*
    AGENT
*Wade Korney*
    ATTORNEY Aug. 6, 1957   J. E. M. TAYLOR   2,801,829
SUPERSONIC AIRPLANE COOLING SYSTEM
Filed Feb. 24, 1955   2 Sheets-Sheet 2
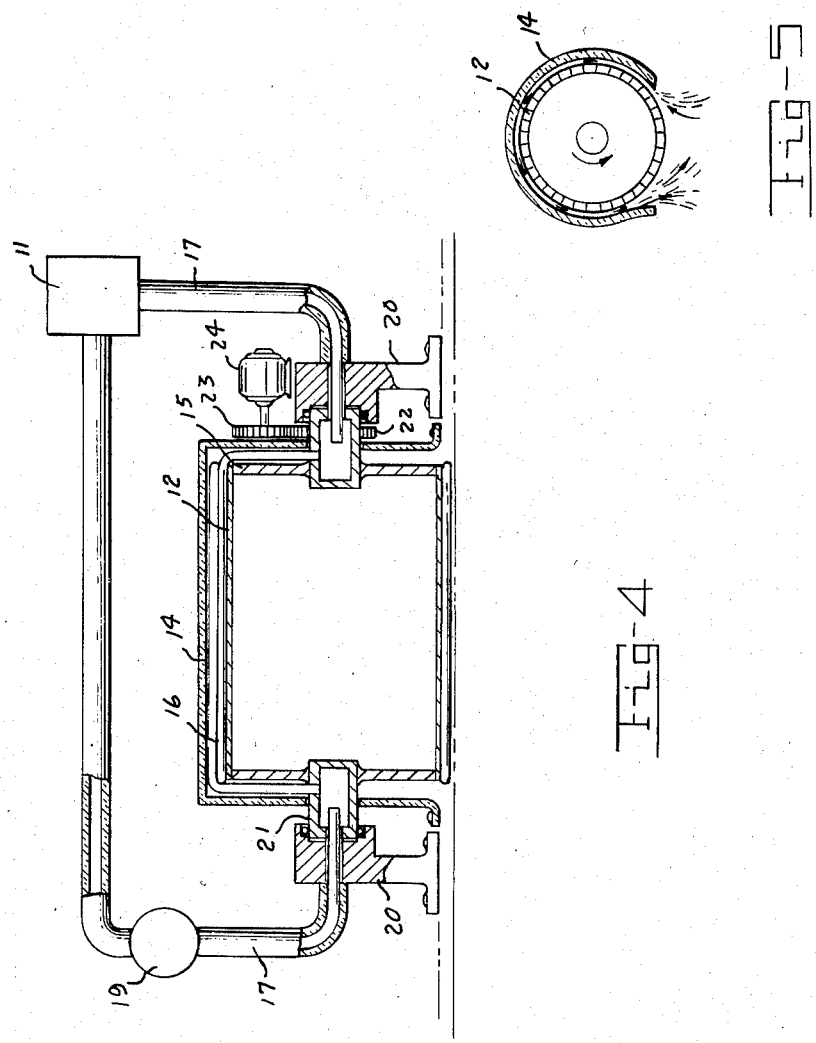
INVENTOR.
JOHN E.M. TAYLOR
BY 2,801,829

SUPERSONIC AIRPLANE COOLING SYSTEM

John E. M. Taylor, Cleveland Heights, Ohio

Application February 24, 1955, Serial No. 490,439

7 Claims. (Cl. 257—124)

(Granted under Title 35, U. S. Code (1952), sec. 266)

The invention described herein may be manufactured and used by or for the United States Government for governmental purposes without payment to me of any royalty thereon.

This invention relates to a cooling system and more particularly to a cooling system for high speed aircraft. At velocities exceeding the speed of sound, aircraft heating caused by friction between the body of the rapidly moving aircraft and the external air becomes an important consideration. Although the temperature of the external free air may be on the order of −65° F. at altitudes most suitable for high speeds, this friction produces a boundary layer of heated air on the skin or surfaces of the aircraft exceeding 150° F. These temperatures are too high for the pilot to endure and in addition produce adverse effects on certain delicate components. The low temperature of the free external air would provide an attractive heat sink for a heat exchanger mounted on the aircraft, but since the heat exchanger moves with the aircraft, the high temperature boundary layer of heated air would form on its surface and effectively insulate it from the external low temperature air. If this boundary layer were eliminated, the low temperature of the external air could be utilized to cool selected portions of the aircraft.

It is therefore a principal object of this invention to provide a cooling system for high speed aircraft which utilizes the low temperatures of surrounding free air as a heat sink.

A further object of this invention is to prevent a high temperature boundary layer from forming on the surfaces of a heat exchanger mounted in an aircraft.

Further objects and advantages of this invention will be apparent from the following description taken in conjunction with accompany drawings, wherein:

Fig. 1 is a diagram showing the present invention installed in an airplane.

Fig. 2 is a perspective view of a heat exchanger disclosing the heat exchanger tubes mounted on the surface of a cylinder.

Fig. 3 is a perspective view of the rotary heat exchanger and closely fitting insulated cover.

Fig. 4 is an elevation of a rotary heat exchanger mounted on the body of the aircraft.

Fig. 5 is an enlarged elevation of the heat exchanger rotating inside the stationary cover and indicating the pumping action between the heat exchanger and the cover.

Referring to Fig. 1, a heat exchanger 12 is rotatably mounted in an opening 13 in the body of an airplane 10. A compartment 11, to be cooled, is connected to the heat exchanger by insulated pipes 17. A pump 19 maintains a coolant, such as air circulating between compartment 11 and heat exchanger 12. An insulated cover 14, whose purpose is described below, is rigidly secured to the body of the aircraft and closely surrounds a substantial portion of heat exchanger as seen in Fig. 3. Heat exchanger 12 comprises a cylindrical supporting body 15 including integral hollow stub shafts 21. Heat exchanger tubes 16 are mounted on the surface of cylinder body 15. As best seen in Fig. 4, hollow stub shafts 21 are rotatably mounted in bearings 20 secured to the body of the aircraft. These hollow stub shafts have the added function of connecting the rotating heat exchanger tubes on the surface of the cylinder 15 with the stationary insulated pipes 17.

Pinion gear 22 is integrally secured to one of these stub shafts and meshes with driving gear 23, integrally connected to the shaft of motor 24. As seen in Fig. 4, the motor is electric, but any controllable driving source for gear 23 would be suitable.

As seen in Fig. 1, a portion of the surface of heat exchanger 12 is exposed to the outer low temperature air. The insulated cover 14, see Fig. 3, closely fits around all other surfaces substantially preventing access of air to them.

In use, motor 24, controlled by the speed of the aircraft, rotates heat exchanger 12 so its peripheral velocity is equal to the speed of the aircraft. The axis of rotation of the heat exchanger is always perpendicular to the direction of flight of the aircraft, and as seen in Fig. 1 and Fig. 5, the sense of rotation is counterclockwise. With this arrangement the portion of the heat exchanger exposed to the outer low temperature free air will have little relative velocity with respect to that air, and as a result, no frictional heated boundary layer will form on this part of the heat exchanger. This permits the heat exchanger to utilize the low temperature of outer air as a heat sink, and thereby cool selected portions of the aircraft.

At this point the importance of the insulated cover becomes apparent. If the peripheral velocity of the heat exchanger is equal to the speed of the aircraft and the portions of the heat exchanger in contact with the free outer air have no relative velocity with respect to that air, then the peripheral portions of the heat exchanger on the diametrically opposite side of the heat exchanger will move at twice the velocity of the aircraft relative to the outer air and at the velocity of the aircraft with respect to air moving with the aircraft. As a result, if the air moving with the aircraft, had free access to the heat exchanger, a boundary layer of heated air would form on these surfaces opposing the cooling effect of the outer air. The closely fitting insulated cover substantially prevents this. What small amount of air that does enter the little space between the insulating cover and the rotating heat exchanger is accelerated by the rotational motion in a direction tangential to the periphery of the heat exchanger between the covered portion and the surface of the heat exchanger and finally is pumped out of the ship at opening 13, see Fig. 5. This in effect keeps the region between the heat exchanger and the insulated cover substantially free from air and prevents formation of the objectionable heated boundary layer. The consequence of all of this is that the effective temperature at the surface of the heat exchanger is the temperature of the external air, and thus makes practical the effective use of this low temperature air as a heat sink for cooling the aircraft.

The invention may be embodied with other specific functions without departing from the spirit or essential characteristics thereof. The present embodiment is therefore to be considered as illustrative and not restrictive, the scope of the invention being indicated by the appended claims rather than the foregoing description, and all changes which come within the meaning and range of the claims and therefor considered to be embodied therein.

What I claim is:

1. A cooling system for high velocity vehicles moving through an external free fluid at speeds high enough to produce a frictional, high temperature, fluid boundary layer on its external surfaces comprising heat exchanger means movably mounted on the vehicle for cooling selected portions of the vehicle, a portion of said heat exchanger means being in contact with the external free fluid through which the vehicle moves, means connected to said heat exchanger means and controlled by the speed of the vehicle for reducing the relative velocity between said portion of the heat exchanger and the external free fluid to prevent the formation of the frictional high temperature fluid boundary layer on said portion of the heat exchanger.

2. The invention set forth in claim 1 wherein the heat exchanger is shaped as a surface of revolution, said heat exchanger rotatably mounted on said vehicle, a portion of the surface of the heat exchanger in contact with the external free fluid, means to rotate said heat exchanger so the periphery moves at the same speed as the vehicle, said heat exchanger positioned so there is no relative velocity between the portion of the heat exchanger in contact with the external free fluid and the free fluid.

3. The invention set forth in claim 2 including a cover fixed to the vehicle and closely surrounding all surfaces of the heat exchanger not in contact with the free external fluid.

4. The invention set forth in claim 3 wherein the heat exchanger comprises a rotatable cylindrical support, heat exchanger tubes mounted on the surface of the cylindrical support, said heat exchanger tubes conforming to the shape of the cylindrical support, means connecting said heat exchanger tubes with selected portions of the vehicle to be cooled, and means for circulating a heat absorbing coolant through said connecting means between said heat exchanger and said selected portions of the vehicle.

5. The invention set forth in claim 1 wherein the high velocity vehicle is a supersonic airplane and the external free fluid is air.

6. The invention set forth in claim 1 wherein the means controlled by the speed of the vehicle for reducing the relative velocity between said portion of the heat exchanger and the external free fluid comprises a movable support mounted on the vehicle, driving means controlled by the speed of the vehicle connected to said support, said heat exchanger mounted on said support and positioned with respect to the vehicle so that when the driving means actuate said movable support, the relative velocity between the portion of the heat exchanger in contact with the external free fluid and the external free fluid is decreased.

7. In combination, a heat exchanger exposed to the ambient air and mounted on a high velocity vehicle moving through an external free fluid at speeds high enough to produce a frictional high temperature fluid boundary layer on the external surfaces of the vehicle, with movable means connected to the heat exchanger and controlled by the speed of the vehicle for reducing the relative velocity between the heat exchanger and the external free fluid to prevent the formation of the high temperature frictional fluid boundary layer on surfaces of the heat exchanger exposed to the external free fluid independently of the speed of the vehicle.

References Cited in the file of this patent

UNITED STATES PATENTS

| | | |
|---|---|---|
| 2,165,443 | Berlin | July 11, 1939 |
| 2,311,984 | Guild | Feb. 23, 1943 |
| 2,393,338 | Roebuck | Jan. 22, 1946 |
| 2,524,066 | Anderson | Oct. 3, 1950 |